(12) United States Patent
Huang

(10) Patent No.: US 11,338,720 B2
(45) Date of Patent: May 24, 2022

(54) TOOL FOR REPLACING A STRAP OF A TIE-DOWN APPARATUS

(71) Applicant: Ping-Chun Huang, Taichung (TW)

(72) Inventor: Ping-Chun Huang, Taichung (TW)

( * ) Notice: Subject to any disclaimer, the term of this patent is extended or adjusted under 35 U.S.C. 154(b) by 561 days.

(21) Appl. No.: 16/511,000

(22) Filed: Jul. 15, 2019

(65) Prior Publication Data

US 2021/0016702 A1 Jan. 21, 2021

(51) Int. Cl.
*B60P 7/08* (2006.01)
*B25B 27/14* (2006.01)

(52) U.S. Cl.
CPC ............ *B60P 7/0853* (2013.01); *B25B 27/14* (2013.01); *B60P 7/083* (2013.01); *B60P 7/0846* (2013.01)

(58) Field of Classification Search
CPC . B66D 3/02; B66D 3/14; B60P 7/0823; B60P 7/00; B60P 7/083; B60P 7/0846; Y10T 24/21; F16G 11/12; B23P 11/00; B23P 15/00; B23P 15/14; H02G 1/00; H02G 1/083; B25B 27/14; B25B 13/48; B25B 15/04
USPC ................................. 29/270, 274, 278, 281.5
See application file for complete search history.

(56) References Cited

U.S. PATENT DOCUMENTS

| | | | | |
|---|---|---|---|---|
| 8,308,410 | B2 * | 11/2012 | Foryan | B60P 7/083 410/103 |
| 2015/0352997 | A1 * | 12/2015 | Huang | B65H 16/005 242/407 |
| 2016/0193982 | A1 * | 7/2016 | Wu | B60P 7/083 242/395 |

* cited by examiner

*Primary Examiner* — Joseph J Hail
*Assistant Examiner* — Robert C Moore
(74) *Attorney, Agent, or Firm* — Bruce Stone LLP; Joseph A. Bruce

(57) ABSTRACT

A tie-down apparatus includes a frame, a reel, a coils spring and a strap-replacing tool. The reel is supported on the frame. The coil spring includes an end connected to the frame and another end connected to the reel. The strap-replacing tool for gear includes a gear and a pawl. The gear is connected to the reel at an end and formed with teeth on a periphery. The is pawl engaged with the teeth of the gear so that the pawl prevents the gear from rotation in a first sense of direction and that the pawl allows the gear to spin in a second sense of direction opposite to the first sense of direction. The pawl keeps the gear in position against torque provided from the coil spring via the reel that tends to rotate the gear in the first sense of direction.

13 Claims, 11 Drawing Sheets

TOOL FOR REPLACING A STRAP OF A TIE-DOWN APPARATUS

BACKGROUND OF INVENTION

1. Field of Invention

The present invention relates to a tie-down apparatus and, more particularly, to a tool for replacing a strap of a tie-down apparatus.

2. Related Prior Art

A conventional tie-down apparatus includes a frame, a reel, at least one strap and a coil spring. The reel is supported on the frame. The strap includes an end connected to the reel and another end connected to a hook. The coil spring is connected to the reel at an end and connected to the frame at another end. The coil spring is substantially not loaded when the strap is completely wound on the reel.

In use, the strap is unwound from the reel and located around an object to be tied down. As the strap is unwound from the reel, the coil spring is loaded, i.e., the diameter of the coil spring is reduced and the number of rounds of the coil spring is increased.

The object might include a sharp corner that could wear away or cut the strap, i.e., jeopardizing the strength of the strap. Thus, the strap might be fractured. Hence, the security of the object and/or the safety of persons around the object could be compromised. In such a case, the entire tie-down apparatus could be replaced with a new one or the damaged strap could be replaced with a new one.

It costs a lot to replace the tie-down apparatus with a new one. It costs relatively little to replace the damaged strap with a new one although it is quite difficult to maneuver the coil spring. It requires a specific tool to unload the coil spring, and load and calibrate the coil spring again. Quite often, the coil spring springs out and hurts a user while the user is maneuvering the coil spring.

The present invention is therefore intended to obviate or at least alleviate the problems encountered in prior art.

SUMMARY OF INVENTION

It is the primary objective of the present invention to provide a tie-down apparatus with a strap-replacing tool.

To achieve the foregoing objective, the tie-down apparatus includes a frame, a reel, a coils spring and a strap-replacing tool. The reel is supported on the frame. The coil spring includes an end connected to the frame and another end connected to the reel. The strap-replacing tool for gear includes a gear and a pawl. The gear is connected to the reel at an end and formed with teeth on a periphery. The pawl is engaged with the teeth of the gear so that the pawl prevents the gear from rotation in a first sense of direction and that the pawl allows the gear to spin in a second sense of direction opposite to the first sense of direction. The pawl keeps the gear in position against torque provided from the coil spring via the reel that tends to rotate the gear in the first sense of direction.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
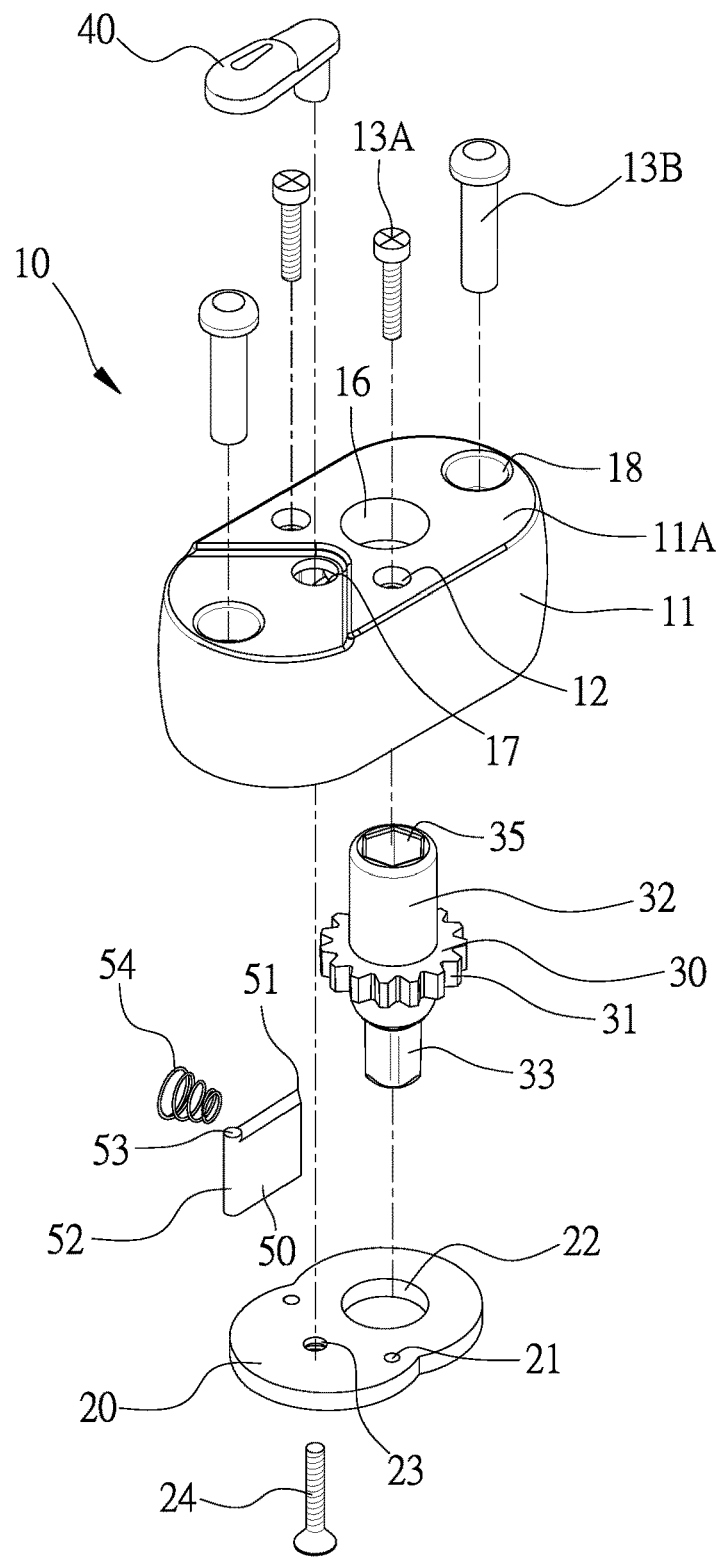
FIG. 1 is an exploded view of a strap-replacing tool according to the preferred embodiment of the present invention.
Figure 2:
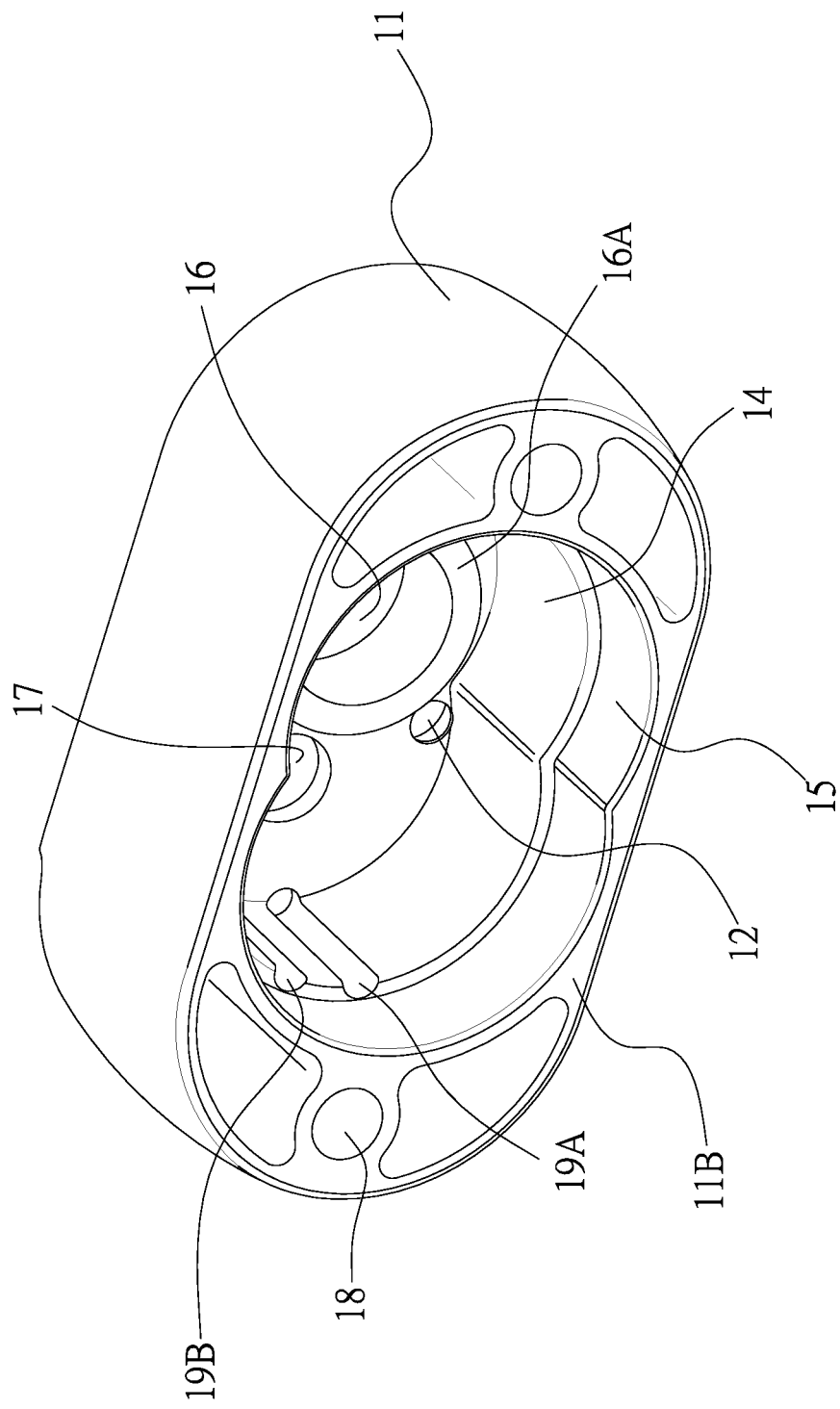
FIG. 2 is a perspective view of a shell of the strap-replacing tool shown in FIG. 1.
Figure 3:
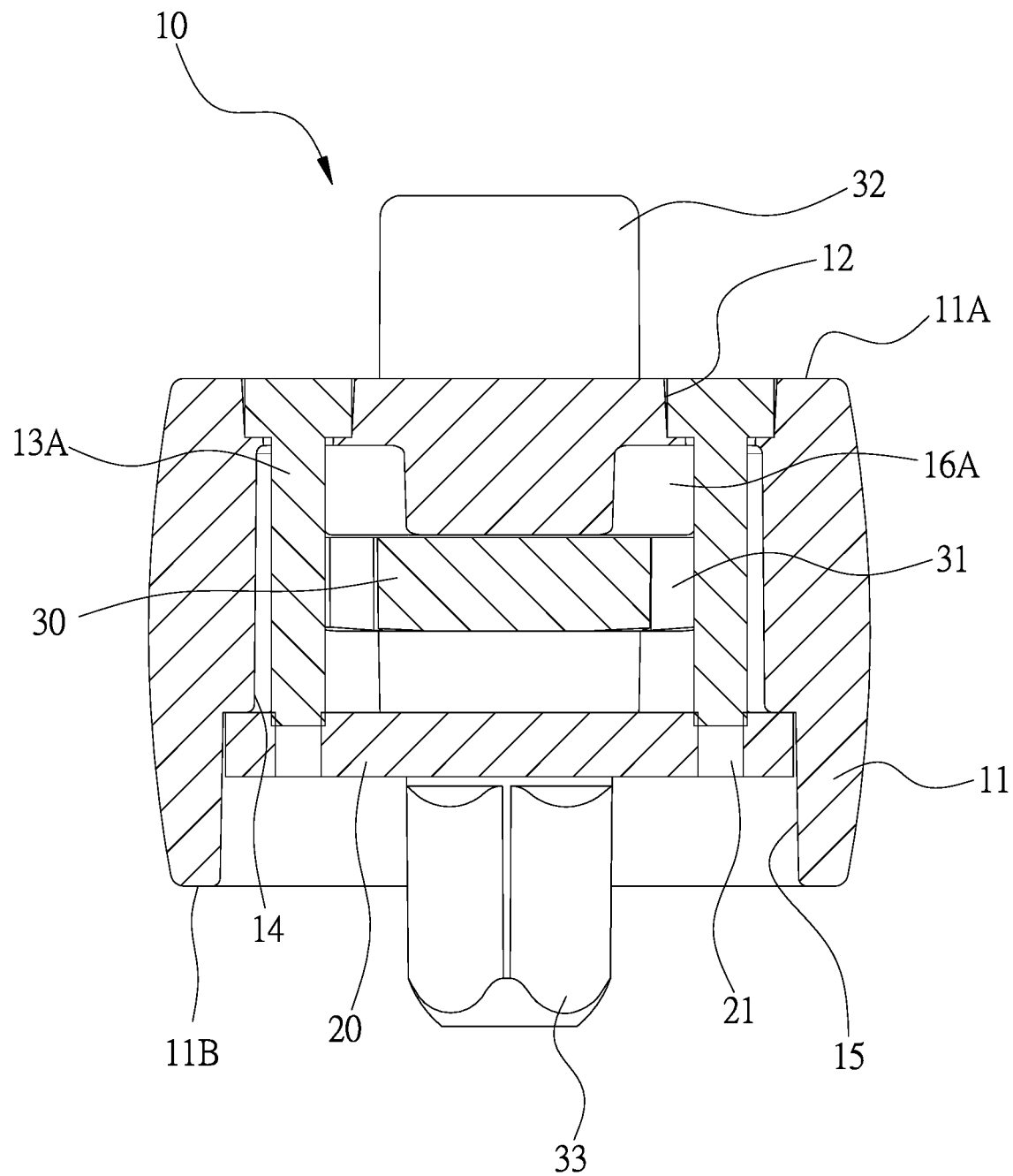
FIG. 3 is a cross-sectional view of the strap-replacing tool shown in FIG. 1.

Referring to FIGS. 1 through 3, a strap-replacing tool 10 includes a shell 11, a cover 20, a gear 30, a releasing element 40, a pawl 50 and a spring 54 according to the preferred embodiment of the present invention. The shell 11 includes an upper portion 11A, a lower portion 11B, two counter-bored holes 12, two chambers 14 and 15, an opening 16, an aperture 17, two counter-bored holes 18 and two grooves 19A and 19B. The counter-bored holes 12, the opening 16 and the aperture 17 are made in the upper portion 11A. The chamber 14 is in communication with the counter-bored holes 12, the opening 16 and the aperture 17. The chamber 15 is in communication with the chamber 14. The chamber 15 is located further from the upper portion 11A than the chamber 14. The chamber 15 is shaped like the chamber 14. The chamber 15 covers a larger area than the chamber 14. The shell 11 further includes an annular rib 16A extending around the opening 16 in the chamber 14. The counter-bored holes 18 extend throughout the thickness of the shell 11. The chambers 14 and 15 are located between the counter-bored holes 18. The grooves 19A and 19B are made in a wall that extends around the chamber 14.

Figure 7:
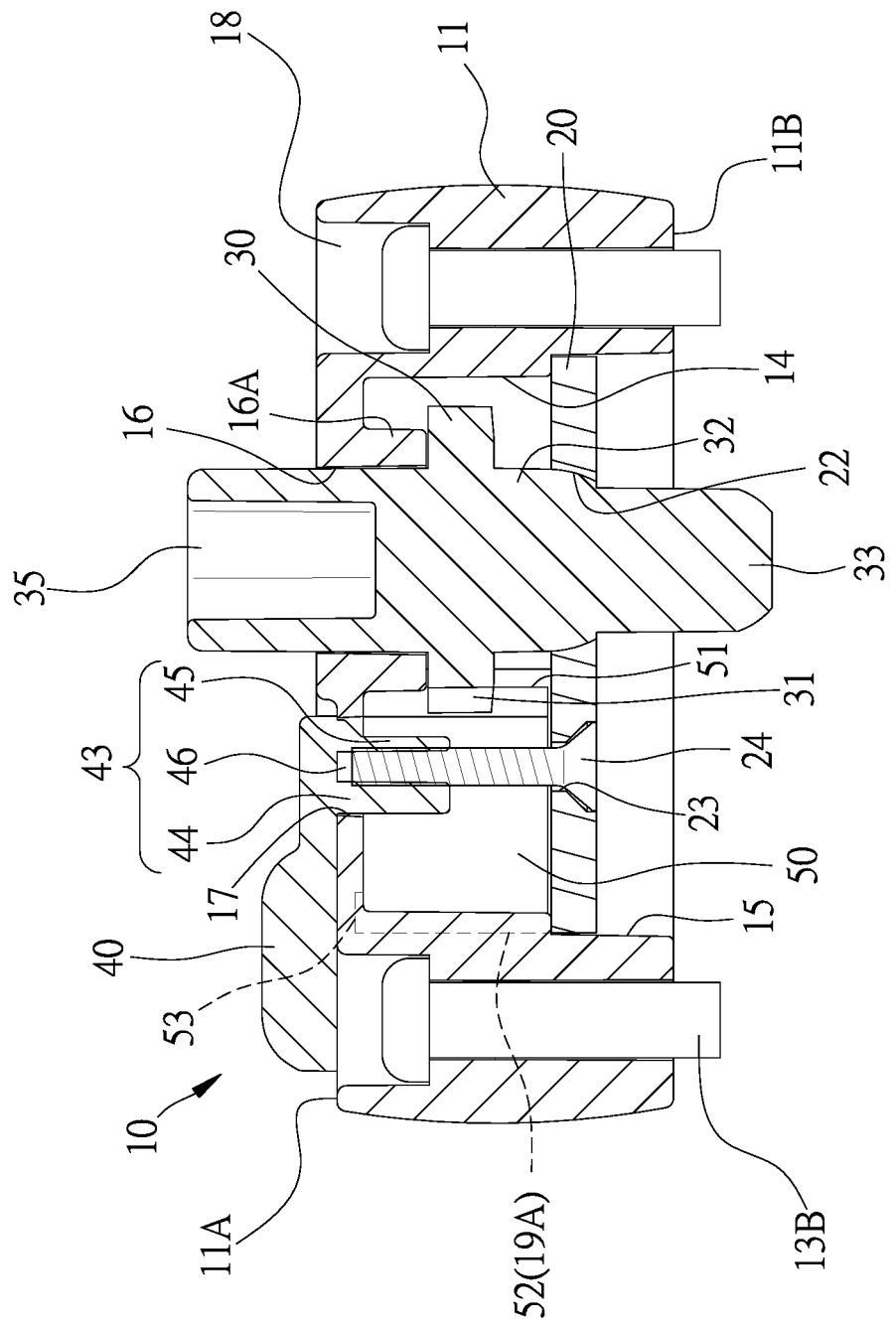
FIG. 7 is a cross-sectional view of the strap-replacing tool taken along a line AA shown in FIG. 6.

Referring to FIGS. 1 and 7, the cover 20 includes two screw holes 21, an opening 22 and a counter-bored hole 23. The cover 20 is compliant to the chamber 15. The cover 20 is inserted in the chamber 15 so that the cover 20 covers the chamber 14. The opening 22 is aligned with the opening 16. The counter-bored hole 23 is aligned with the aperture 17.

Referring to FIG. 3, the strap-replacing tool 10 further includes two threaded bolts 13A. The threaded bolts 13A are inserted in the screw holes 21 of the cover 20 via the counter-bored holes 12 of the shell 11, thereby locking the cover 20 to the shell 11.

The gear 30 includes teeth 31, an axle 32 and an insert 33. The teeth 31 are formed on the periphery of the gear 30. The axle 32 includes an upper section extending from an upper portion of the gear 30 and a lower section extending from a lower portion of the gear 30. The upper section of the axle 32 is formed with a socket 35. The socket 35 preferably includes a hexagonal recess. The recess of the socket 35 can be in another proper shape in another embodiment. The lower section of the axle 32 is formed with an insert 33. The insert 33 preferably includes a square profile. However, the insert 33 can include another proper profile in another embodiment. The insert 33 is smaller than the lower section of the axle 32, thereby providing a shoulder.

Figure 4:
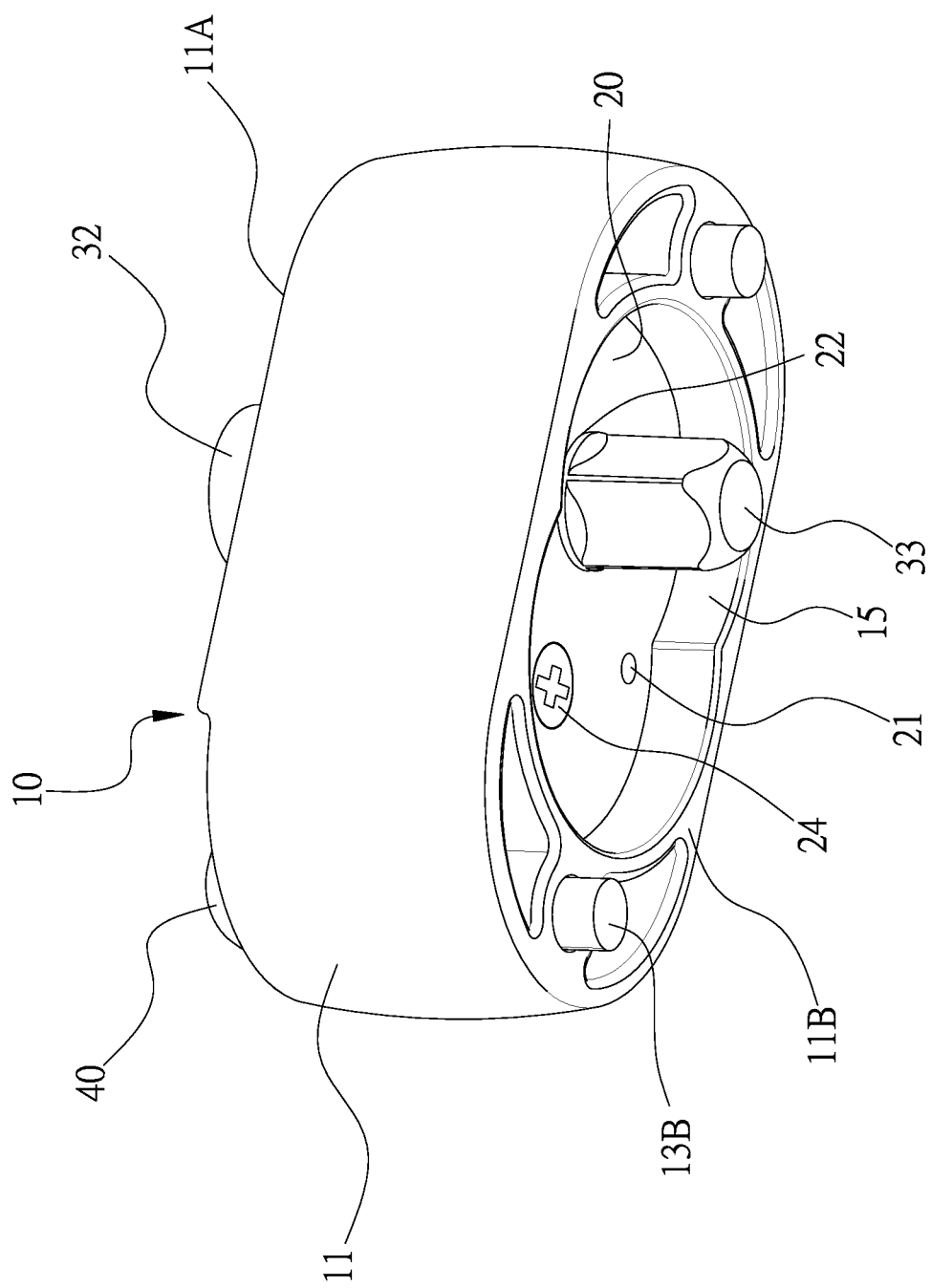
FIG. 4 is a perspective view of the strap-replacing tool shown in FIG. 1.
Figure 6:
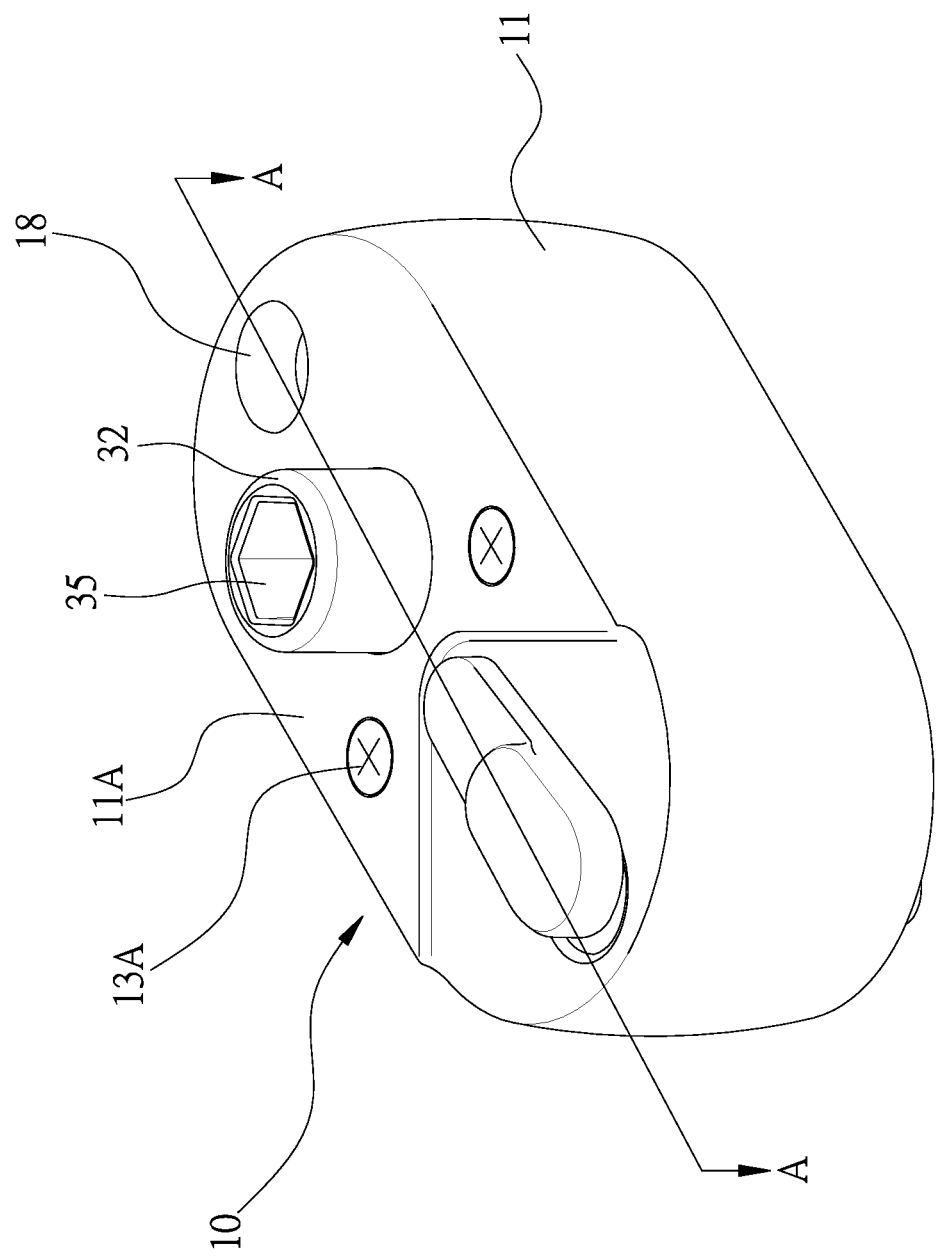
FIG. 6 is another perspective view of the strap-replacing tool shown in FIG. 1.

Referring to FIGS. 4, 6 and 7, the upper section of the axle 32 is inserted in the opening 16 and the lower section of the axle 32 is inserted in the opening 22. The teeth 31 are located against the upper portion 11A of the shell 11. The shoulder formed between the insert 33 and the lower section of the axle 32 is located against the cover 20. Thus, the gear 30 is kept connected to the shell 11 and the cover 20. The gear 30 is allowed to spin in the chamber 14. The socket 35 extends from the shell 11 via the opening 16. The insert 33 extends beyond the cover 20 via the opening 22.

Figure 8:
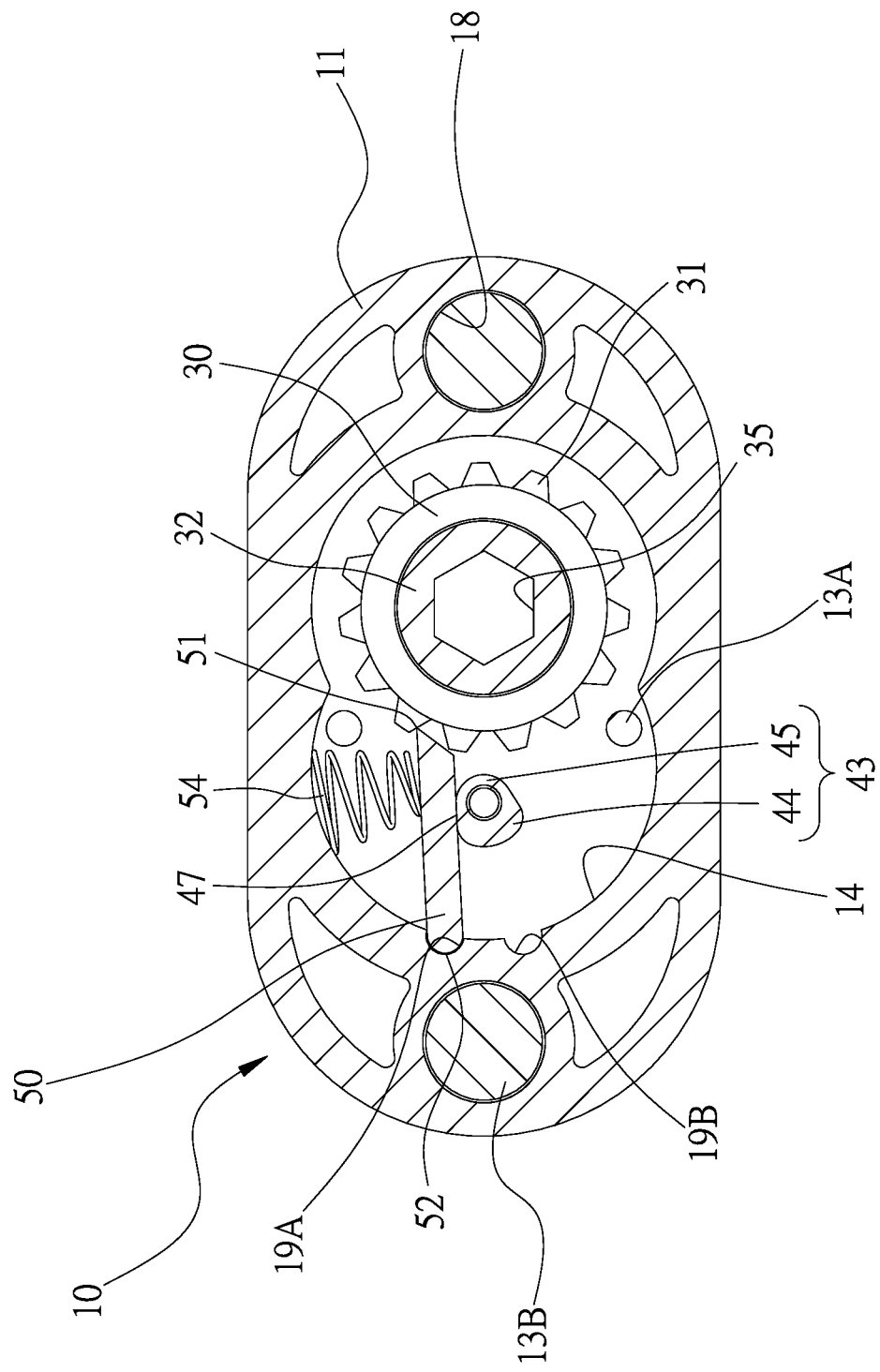
FIG. 8 is another cross-sectional view of the strap-replacing tool shown in FIG. 6.

Referring FIGS. 1, 7 and 8, the pawl 50 is a rigid element made of a metal plate for example. The pawl 50 is formed with an upper edge extending and two lateral edges. One of the lateral edges of the pawl 50 is a sharp edge 51. The remaining one of the lateral edges of the pawl 50 is a rounded edge 52. A boss 53 extends from the upper edge of the pawl 50, above the rounded edge 52. The boss 53 is inserted in a recess (not numbered) in the upper portion of the shell 11 and the rounded edge 52 is inserted in the groove 19A to allow smooth pivoting of the pawl 50.

The pawl 50 is inserted in the chamber 14 of the shell 11, in the vicinity of the gear 30. The sharp edge 51 can be engaged with any of the teeth 31 to prevent the gear 30 from rotation.

Referring to FIG. 8, in use, as the gear 30 is rotated clockwise, the teeth 31 rattle on the sharp edge 51 of the pawl 50 and push the pawl 50 away, thereby allowing the gear 30 to spin relative to the shell 11. As the gear 30 is rotated counterclockwise, one of the teeth 31 is engaged with the sharp edge 51 of the pawl 50 to prevent the gear 30 from spinning relative to the shell 11.

The pawl 50 is biased toward the gear 30 by the spring 54. The spring 54 is preferably a compression spring in the form of a helical spring with an end abutted against the wall of the chamber 14 of the shell 11 and another end abutted against the pawl 50.

Figure 5:
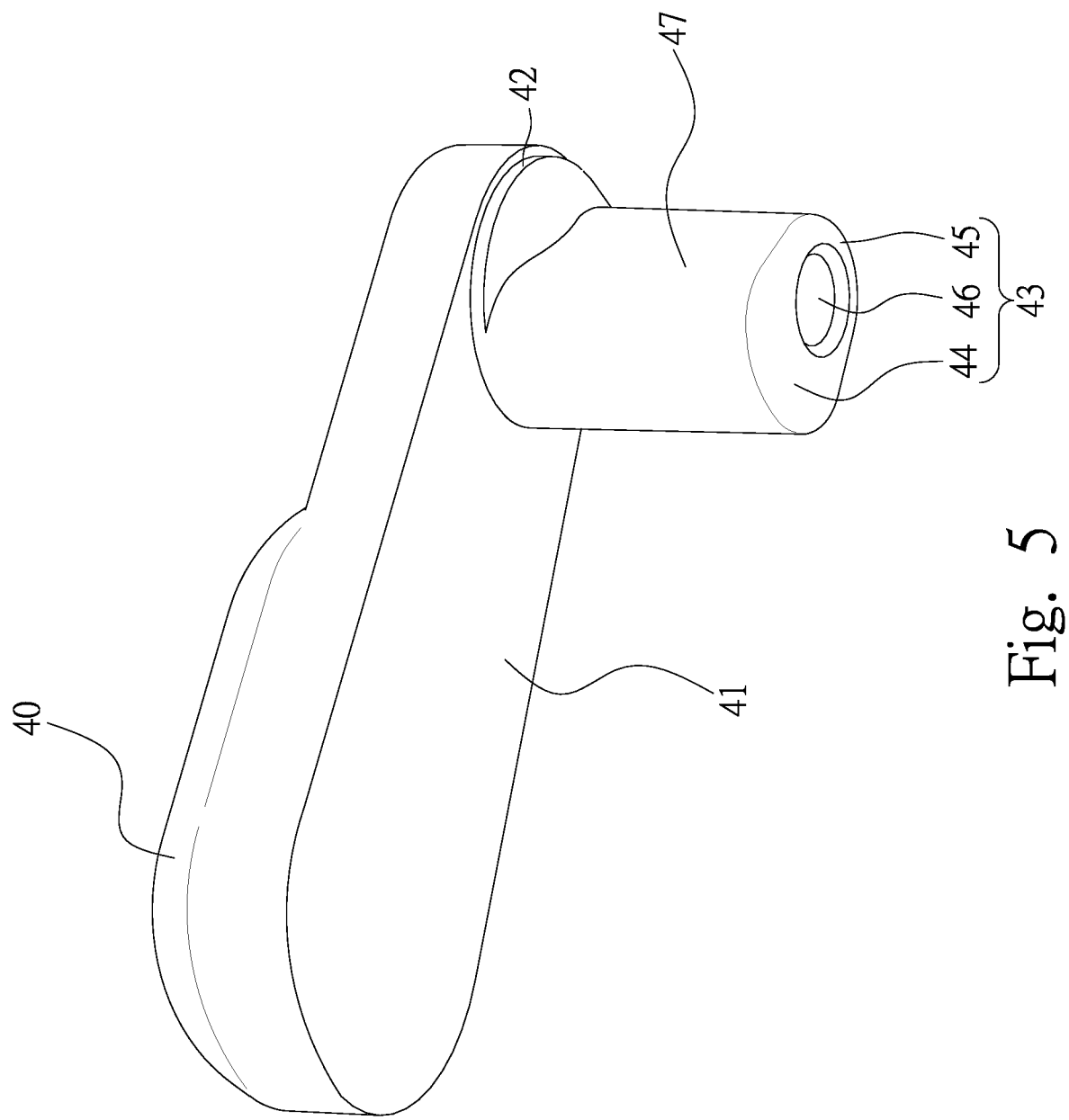
FIG. 5 is a perspective view of a releasing element of the strap-replacing tool shown in FIG. 1.

Referring to FIGS. 5, 7 and 8, the releasing element 40 includes a handle 41, a shaft 42 extending from the handle 41 at the right angle, and a cam 43 extending from the shaft 42. Preferably, the shaft 42 is short. The periphery of the cam 43 includes a lobe 44, a non-protrusive portion 45 located opposite to the lobe 44, and two intermediate portions 47 each of which is located between the lobe 44 and the non-protrusive portion 45. The cam 43 further includes a screw hole 46. The lob 44 is located further from the center of the screw hole 46 than the non-protrusive portion 45 is.

The shaft 42 is inserted in the aperture 17 of the shell 11 and the cam 43 is inserted in the chamber 14. The spring 54 biases the pawl 50 against one of the intermediate portions 47 of the cam 43. A threaded bolt 24 is inserted in the screw hole 46 of the cam 43 via the counter-bored hole 23 of the cover 20. Thus, the releasing element 40 is kept connected to the shell 11 and the cover 20. The handle 41 of the releasing element 40 can be pivoted out of the shell 11. The cam 43 adjusts the extent to which the pawl 50 is pivoted toward the gear 30.

Alternatively, the boss 53 can be inserted in another recess (not numbered) in the upper portion of the shell 11 and the rounded edge 52 is inserted in the groove 19B to allow smooth pivoting of the pawl 50. In such a case, the pawl 50 and the spring 54 are located on another side of the cam 43, and the spring 54 biases the pawl 50 against the remaining one of the intermediate portions 47 of the cam 43. Thus, the gear 30 is allowed to spin counterclockwise relative to the shell 11.

Figure 9:
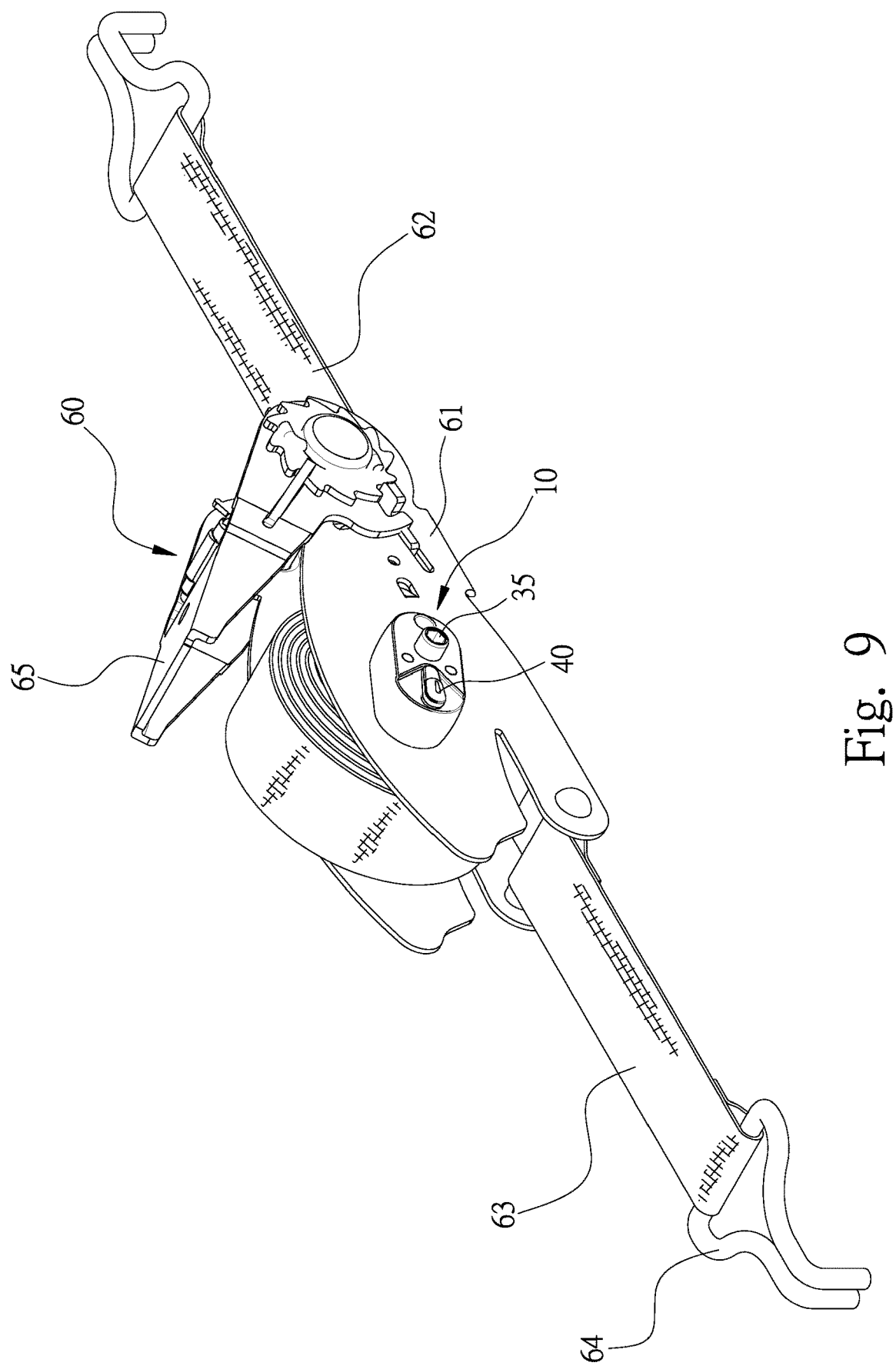
FIG. 9 is a perspective view of a tie-down apparatus equipped with the strap-replacing tool shown in FIG. 1.
Figure 10:
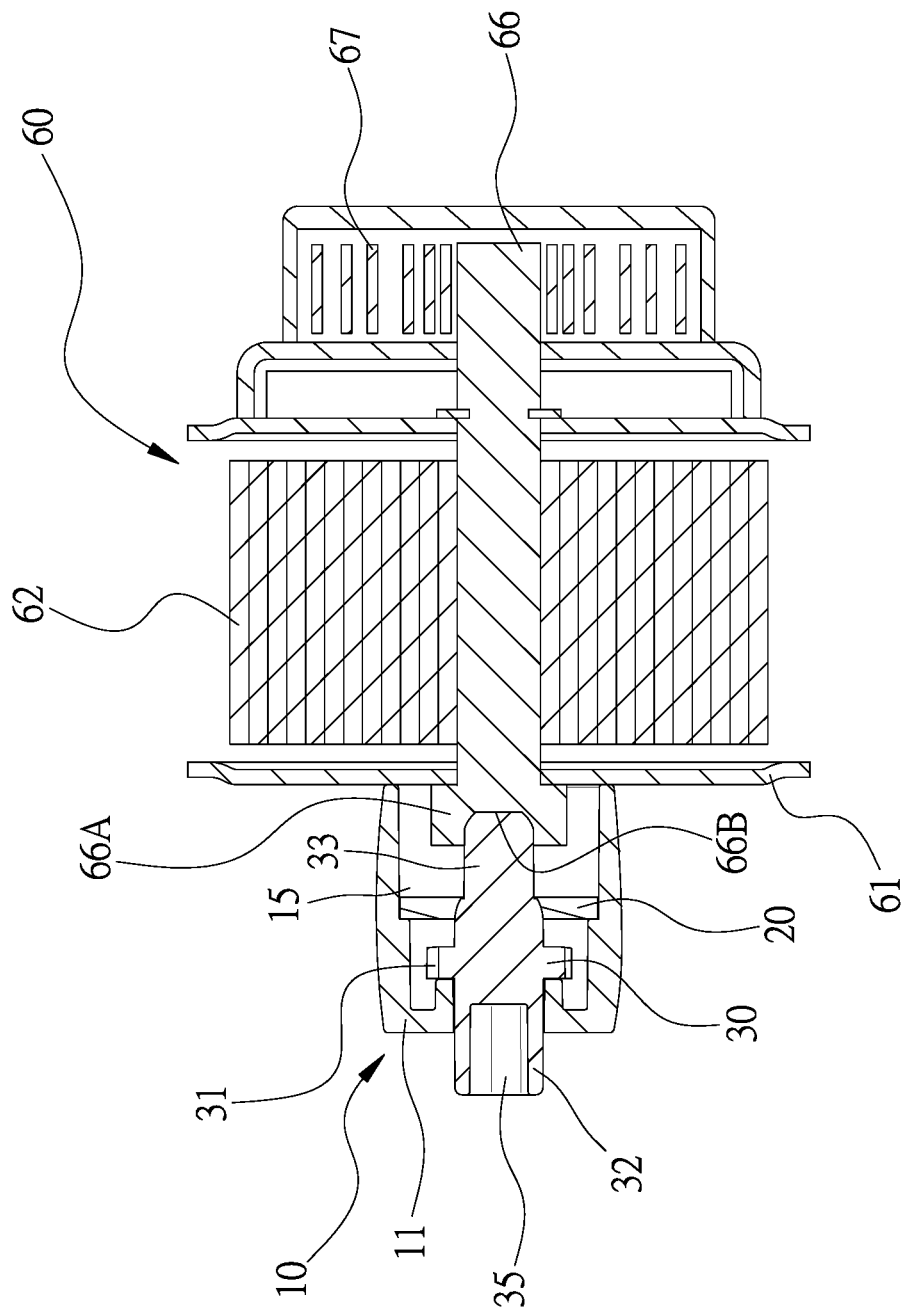
FIG. 10 is a cross-sectional view of the tie-down apparatus and the strap-replacing tool shown in FIG. 9.

Referring to FIGS. 9 and 10, the strap-replacing tool 10 is used with a tie-down apparatus 60 that includes a frame 61, two straps 62 and 63, two hooks 64, a handle 65, a reel 66 and a coil spring 67. The reel 66 is supported on the frame 61. The reel 66 includes an enlarged end 66A made with a recess 66B. The strap 62 includes an end connected to the reel 66 and another end connected to one of the hooks 64. The strap 62 is wound on the reel 66. The strap 63 includes an end connected to the frame 61 and another end connected to the remaining hook 64. The handle 65 can be rotated in a sense of direction to rotate the reel 66 to wind the strap 62. The handle 65 cannot be rotated in an opposite sense of direction to rotate the reel 66. The coil spring 67 includes an end connected to the frame 61 and another end connected to another end of the reel 66.

The strap-replacing tool 10 is located next to the frame 61. The enlarged end 66A of the reel 66 is inserted in the chamber 15 of the shell 11. The recess 66B is a square recess that receives the insert 33 so that they are rotatable together, i.e., not rotatable relative to each other. Thus, the pawl 50 keeps the gear 30 (FIG. 8) in position, against a torque provided from the coil spring 67 via the reel 66. Two fasteners 13B are inserted in the frame 61 via the counter-bored holes 18 of the shell 11 (FIGS. 1, 4 and 7), thereby securing the strap-replacing tool 10 to the tie-down apparatus 60. The fasteners 13B are preferably rivets.

To replace the strap 62 with a new one, the strap 62 is complete unwound from the reel 66. Accordingly, the coil spring 67 is loaded. Then, the strap 62 is replaced with a new one without any substantial risks of hurting a user because the reel 66 is kept in position by the gear 30, which is in turn kept in position by the pawl 50. In addition, the coil spring 67 is kept loaded. Thus, the coil spring 67 does not have to be loaded and calibrated again after the strap 62 is replaced with a new one.

After the strap 62 is replaced with a new one, the releasing element 40 is pivoted relative to the shell 11 to rotate the cam 43 in a same sense of direction to remove the lobe 44 from the pawl 50. Thus, the sharp edge 51 of the pawl 50 is disengaged from the teeth 31 (FIGS. 8 and 9) to allow rotation of the gear 30. Hence, the loaded coil spring 67 rotates the reel 66 to wind the strap 62.

For example, a portion of a torque-measuring apparatus can be inserted in the socket 35. Then, the torque-measuring apparatus can be operated to measure torque provided from the coil spring 67 via the reel 66 and the gear 30.

Figure 11:
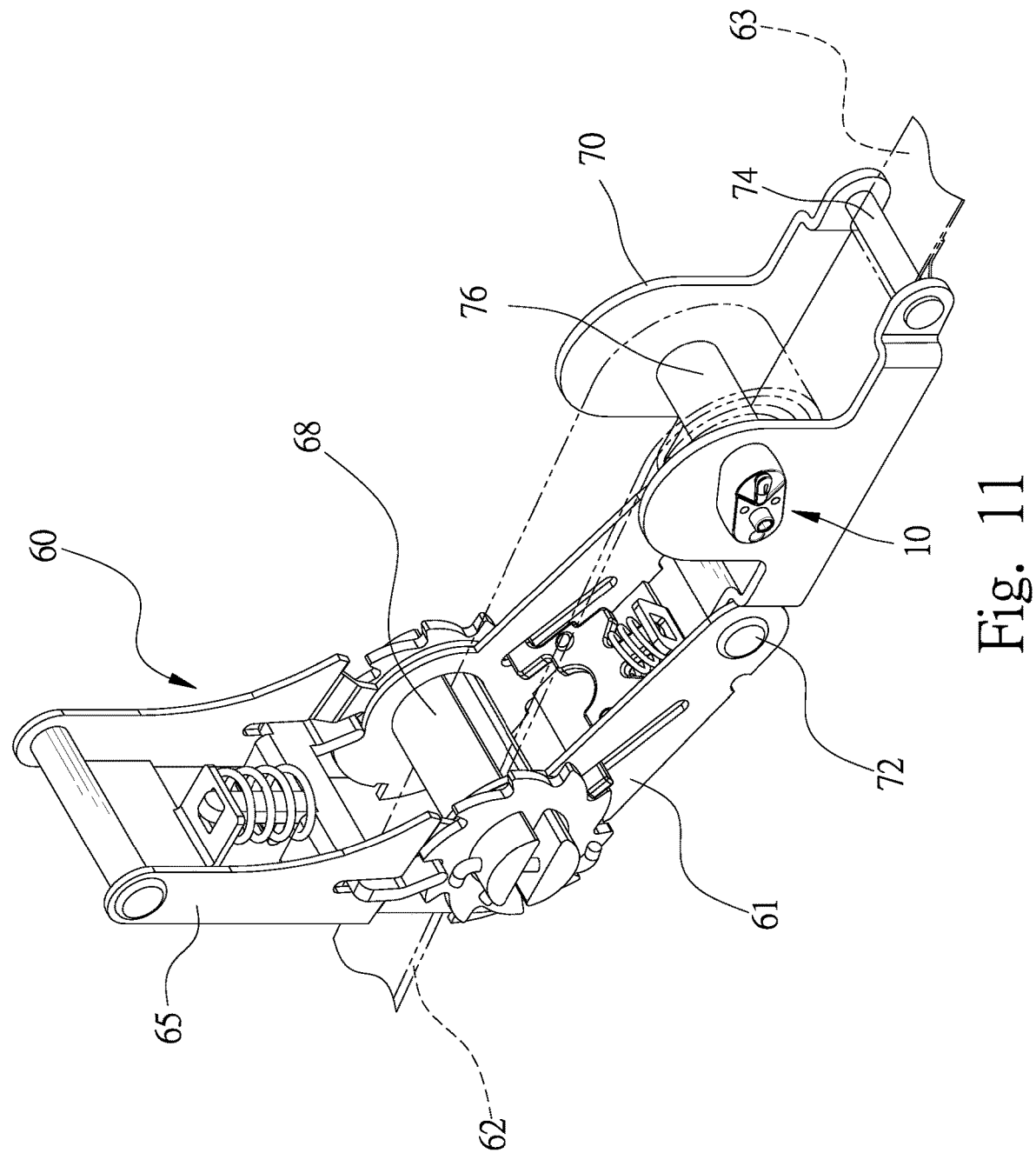
FIG. 11 is a perspective view of another tie-down apparatus equipped with the strap-replacing tool shown in FIG. 1.

Referring to FIG. 11, the strap-replacing tool 10 is connected to an additional frame 70 instead of the frame 60. The frame 70 is connected to the frame 60 via a pin 72. The strap 63 is connected to the secondary frame 70 by a pin 74. A reel 76 is supported on the frame 70, between the pins 72 and 74. The strap 62 is wound on the reel 76. The strap 62 extends throughout a slit (not numbered) between two parts (not numbered) of a reel 68. The insert 33 is inserted in a recess made in an end of the reel 76 although not shown. The recess made in an end of reel 76 is identical to the recess 66B.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A tie-down apparatus comprising:
   a frame;
   a reel supported on the frame;
   a coil spring comprising an end connected to the frame and another end connected to the reel; and
   a strap-replacing tool comprising:
      a gear connected to the reel at an end and formed with teeth on a periphery; and
      a pawl comprising an end connected to the frame and another end engaged with the teeth of the gear so that the pawl prevents the gear from rotation in a first sense of direction but allows the gear to spin in a second sense of direction opposite to the first sense of direction, wherein the pawl keeps the gear in position against torque provided from the coil spring via the reel that tends to rotate the gear in the first sense of direction.

2. The tie-down apparatus according to claim 1, wherein the reel is formed with a recess in an end, and the gear comprises, at the end, an insert inserted in the recess of the reel to prevent the gear from rotation relative to the reel.

3. The tie-down apparatus according to claim 2, comprising:
   a shell comprising a small chamber and an opening in communication with the small chamber; and
   a cover comprising an opening corresponding to the opening, wherein the cover is connected to the shell to cover the small chamber;
   wherein the gear is formed an axle comprising two sections inserted in the openings to render the rotation of the gear smooth in the small chamber, and the insert extends from one of the sections of the axle.

4. The tie-down apparatus according to claim 3, wherein the axle comprises a socket formed at the remaining one of the sections of the axle.

5. The tie-down apparatus according to claim 4, wherein the socket comprises a polygonal recess.

6. The tie-down apparatus according to claim 3, wherein the shell comprises a groove in a wall of the small chamber, and the pawl comprises a rounded edge inserted in the groove.

7. The tie-down apparatus according to claim 6, wherein the pawl comprises a sharp edge located opposite to the rounded edge, and the sharp edge is engaged with the teeth of the gear.

8. The tie-down apparatus according to claim 6, wherein the pawl comprises a boss formed above the rounded edge and inserted in a recess in a portion of the shell located above the groove.

9. The tie-down apparatus according to claim 6, wherein the strap-replacing tool comprises a spring inserted in the small chamber of the shell, and the spring biases the pawl toward the gear.

10. The tie-down apparatus according to claim 9, further comprising a releasing element comprising:
    a shaft inserted in an aperture in the shell to allow the releasing element to pivot out of the shell; and
    a cam inserted in the small chamber, wherein the pawl comprises a side in contact with the spring and an opposite side in contact with the cam.

11. The tie-down apparatus according to claim 10, wherein the cam comprises a lobe, a non-protrusive portion and two intermediate portions each of which is formed between the lobe and the non-protrusive portion, and one of the intermediate portions of the cam is in contact with the pawl.

12. The tie-down apparatus according to claim 10, wherein the cam comprises a screw hole, and the strap-replacing tool comprises a threaded bolt inserted in the screw hole of the cam via a counter-bored hole in the cover.

13. A tie-down apparatus comprising:
    a first frame;
    a first reel supported on the frame;
    a second frame connected to the first frame;
    a second reel supported on the second frame;
    a coil spring with an end connected to the second frame and another end connected to the second reel;
    a strap extending through a slit made in the first reel and wound on the second reel; and
    a strap-replacing tool comprising:
       a gear connected to the second reel at an end and formed with teeth on a periphery; and
       a pawl comprising an end connected to the second frame and another end engaged with the teeth of the gear so that the pawl prevents the gear from rotation in a first sense of direction but allows the gear to spin in a second sense of direction opposite to the first sense of direction, wherein the pawl keeps the gear in position against torque provided from the coil spring via the second reel that tends to rotate the gear in the first sense of direction.

* * * * *